Dec. 21, 1937.   F. L. RIVENBURGH   2,102,646
METHOD AND APPARATUS FOR TESTING EGGS
Original Filed Oct. 9, 1930

Inventor:
Frederick Langdon Rivenburgh,
by   Mason Fenwick
Att'ys.

Patented Dec. 21, 1937

2,102,646

UNITED STATES PATENT OFFICE 2,102,646

METHOD AND APPARATUS FOR TESTING EGGS

Frederick Langdon Rivenburgh, Springfield, Ohio

Substitute for application Serial No. 487,603, October 9, 1930. This application April 25, 1935, Serial No. 18,251. Renewed June 4, 1936

38 Claims. (Cl. 175—265)

This invention relates to methods and apparatus for testing eggs, and more particularly concerns the art of determining the fertility of an egg.

This application is refiled on the basis of my forfeited application Serial No. 487,603, filed October 9, 1930.

The poultry industry involves the production of eggs in large quantity, both for incubation and for commercial employment of the whites and yolks. It is essential that the eggs for incubation shall be fertile: while it is preferable that commercial eggs shall be non-fertile. Previously no definite means has existed in the art for the determination of the fertility of an egg until after so long a period of incubation had progressed that the embryo of a fertile egg is visible by candling, and infertile eggs have begun putrefaction, at which time the eggs are unacceptable for human consumption.

In practice it has been found that an average of 35 percent of the eggs employed for incubation do not result in the hatching of chicks. Some of these eggs are entirely sterile, others are of so low a degree of fertility that incubation does not cause the formation of embryonic traces, while others progress through various embryonic stages but do not hatch owing to embryo mortality.

It has now been found that eggs may be classified not only according to their sterility and fertility, i. e. according to whether the egg has capacity of embroyic development: but also eggs may be classified according to relative degree of fertility or life activity, whereby a means is afforded of separating eggs into groups which are sterile, which are of so low fertility that incubation is inadvisable, and those which have such a degree of fertility that incubation will probably lead to hatching. This process and the apparatus therefor requires such a short time for the determination that sterile and weakly fertile eggs are not harmed by the passage of the time required, and in fact may be marketed thereafter for commercial consumption. Thus, a saving is effected not only in reducing the failures in incubation and the consequent reduction in size of incubation apparatus for a given number of hatched chicks, but also the eggs discarded after test are readily saleable: and in fact are to be preferred to the fertile eggs for their keeping and cooking qualities.

This testing of the eggs is accomplished by first arousing the egg, if fertile or alive if it is in a dormant condition: and thereafter determining its inherent potential and/or the response of the activated egg to an exciting medium, which is characteristic of a fertile or live egg in distinction from a sterile or dead egg, and which response varies in degree according to the relative life activity of the egg.

Further, it has been found that hen's eggs, for example, differ not only in the character of the responses, but also in the actual amount or absolute magnitude of the electrical current, according to the length of incubation period which has preceded a test: and hence the test may be employed as an indication of the development of the chick within the egg, and hence also of the length of time of incubation which has occurred. Research has shown that upon incubation, a fertile egg undergoes certain irregular physiological and chemical reactions which change characteristically during the development of the embryo. A fertile or good egg has a natural or inherent electrical potential effect by which the top (the part nearest the embryo) is more negative than the bottom; while a sterile or bad egg has a negligible relative potential between these points, or the top is relatively more positive. In experimentation with the present invention, the following general results have been obtained:

1. An egg in which there is no life activity, i. e. one that is dormant, sterile or dead, gives a slight electrical response in a direction which usually is contrary to that of excitation. This response is substantially the same in amount, regardless of whether or not the egg has passed through an incubative period before dying, or not. The value of this response may be illustrated as follows:

| Excitation | Response |
|---|---|
| Positive | Negative 0.0001 |
| Negative | Positive 0.0001 |

2. When a fertile egg is tested with the present apparatus, the electrical response is in a positive direction regardless of the direction of excitation. The positive response in the apparatus to a negative excitation, however, gradually decreases. As the incubation of the fertile egg progresses, and as the development of the embryo continues, the response to positive excitation normally continues to be positive. The response to negative excitation becomes more negative. The sum of the absolute values of these responses continues to increase, although certain irregularities occur in each individually. The following table illustrates the response after various periods of incubation:

| | Excitation | Response | |
|---|---|---|---|
| Fresh egg | Positive | Positive | 0.0003 |
| Fresh egg | Negative | Positive | 0.0002 |
| About 30 hours | Positive | Positive | 0.0010 |
| About 30 hours | Negative | Negative | 0.0009 |
| 36 Hrs | Positive | Positive | 0.0017 |
| 36 Hrs | Negative | Negative | .0014 |
| 48 Hrs | Positive | Positive | .0023 |
| 48 Hrs | Negative | Negative | .0022 |
| 72 Hrs | Positive | Positive | .0025 |
| 72 Hrs | Negative | Negative | .0031 |
| 96 Hrs | Positive | Positive | .0031 |
| 96 Hrs | Negative | Negative | .0044 |
| 6 Days | Positive | Positive | .0053 |
| 6 Days | Negative | Negative | .0058 |

These tables show that the response is definite in degree and direction and characteristically distinguishes an activated fertile egg from a dormant, sterile, or dead egg. The response of the non-fertile or inactivated fertile egg, to a positive excitation, is negligible or in the opposite direction to the response of the activated fertile egg.

The drawing shows forms of apparatus which may be employed for determining the characteristic response of the egg to excitation.

In Figure 1 is shown a circuit diagram of apparatus for determining the responses of hens' eggs at any period.

Figure 1:
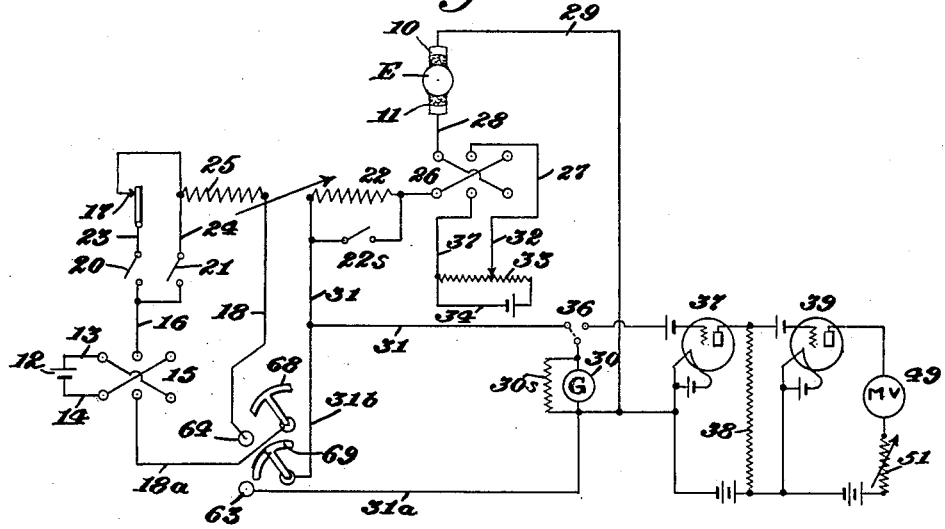

In these figures the terminals 10, 11 are electrodes which may be brought into close contact with the egg E, as will be described more in detail hereinafter. The battery 12 is connected by conductors 13, 14 to a reversing switch 15 which is similarly connected by conductors 16 to the key switches 20 and 21 whereby respectively tetanizing or single currents may be obtained from the secondary winding 22 of the exciting coil, by the passage of the primary current through the respective leads 23, 24 and thence through the primary winding 25 of the exciting coil, and through conductor 18, the contact 64, the timing switch rock arm 68, and conductor 18a, back to the switch 15 and the battery 12.

The secondary winding 22 of the exciting coil is connected by conductor 26 to a reversing switch 27 with a completion of the circuit through the conductor 28, the electrodes 11, 10 with the egg therebetween, the conductor 29, the galvanometer 30 and the conductor 31, back to the secondary coil 22. A compensating device to balance out any accidental currents arising from the egg, i. e., such as might arise from the egg regardless of whether it is fertile and activated or dead, sterile, etc., or existing as phenomena of the circuit itself when the electrode structures are contacted, illustratively comprises the conductor 32 from the reversing switch 27 leading to a tap on a potentiometer resistance 33 which is connected in a loop with the compensating battery 34, with a return by conductor 35 to the reversing switch 27.

A second rock arm 69 of the timing switch is connected by conductor 31b to the conductor 31 and thus to one terminal of the galvanometer 30 while the contact 63 is connected by a conductor 31a to the other terminal of the galvanometer 30. A switch 22s is connected to the terminals of a secondary winding 22 of the induction coil.

Figure 3:
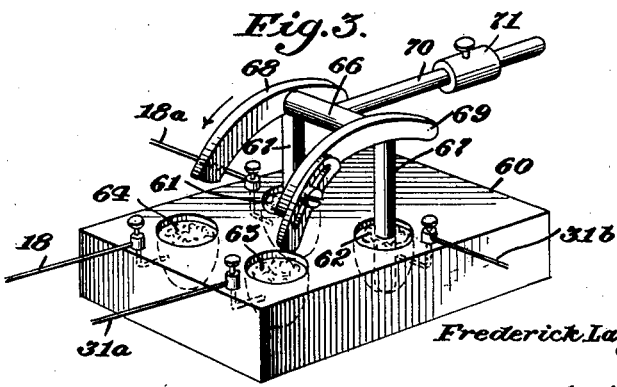
Figure 3 is a perspective view showing a type of control switch which may be employed.

In Figure 3 is shown an illustrative timing switch which comprises the insulating block 60 having recesses in its top to receive the mercury pools 63, 64 which are connected to conductors 18, 31a. A rocking frame has the conductive arms 67 resting in mercury pools 61, 62, an insulating connecting bridge 66, the two rock arms 68, 69, and a tangentially extending arm 70 having an adjustable weight 71. The rock arm 68 is shorter than the arm 69, so that it leaves the pool 64 before the arm 69 leaves the pool 63.

In operation, the electrodes 10, 11, may each be of a suitable non-polarizable material such as silver-silver chloride, etc., and each may have between it and the egg shell a pad which is saturated with saline solution. The pads are contacted and the potentiometer 32, 33 is adjusted for compensating the circuit phenomena and obtaining a zero reading at the galvanometer G. An egg still warm from the incubator is placed between the electrodes, preferably with a vertical minor diameter. The switch 22s is closed to short circuit the secondary winding 22. The potentiometer 32, 33 is adjusted until no deflection of the galvanometer occurs, and hence the position of the potentiometer tap connected to conductor 32 will indicate the E. M. F. of the inherent physiological currents. The switch 21, for a single break shock, is closed with the rock arms 68, 69 out of their respective pools 64, 63. The timing switch is then operated so that the contact arms 68, 69 enter their respective pools. A current now flows from the battery 12 through the reversing switch 15, the switch 21, and the primary coil 25 upon the closure of the rock arm 68 with its contact 64. The induced current in the secondary winding 22 passes through a short circuiting switch 22s. The short circuiting switch 22s is now opened. The timing switch is released so that the rock arm 68 leaves its pool 64, thus interrupting the excitation of the primary winding 25, and hence a "break" induction current is developed by the secondary winding 22 which flows from the winding 22 by conductors 31, 31b, rock arm 69, contact 63, conductor 31a, conductor 29, terminals 10, 11, reversing switch 27, through the compensating battery and potentiometer 34, 35, back to the reversing switch 27, and thence by conductor 26 to the secondary winding 22. It will be noted that the galvanometer 30 is short-circuited at this time. Shortly thereafter, the rock arm 69 passes from its pool 63, thus opening a portion of the circuit including the conductors 31b, 31a. The excitation of the egg may now lead to a response which is indicated by the galvanometer through the circuit extending from electrode 10, through conductor 29, galvanometer 30 and its shunt 30s, conductor 31, secondary winding 22, conductor 26, the reversing switch 27, the compensating battery and potentiometer 34, 33, conductor 28 to electrode 11. The time interval between the disengagement of the rock arms 68, 69 from the pools 64, 63 may be regulated by adjusting the position of the weight 71 and the length of the arm 69.

The galvanometer responds and indicates the passage of this current, being deflected according to the strength of the impulse thus generated and corresponding to the capacity and receptive condition of the egg, whether alive or dead. Thus with a normal egg which has been incubated for thirty-six hours and which is alive, the passage of an exciting current in a relatively downward or negative direction in Figure 1, i. e. from electrode 10 to electrode 11, will normally result in a response by the egg in that it continues to deliver a current, in this downward or negative direction, even after the excitation has ceased. If, on the contrary, with an egg which has been incubated for thirty-six hours, the original excitation is from the electrode 11 to the electrode 10, or in an ascending or positive direction, then the response of the egg after excitation has ceased will likewise be in the positive or ascending direction. In both such instances, the live egg at thirty-six hours of incubation will normally respond by an indication at the galvanometer 30 which is in the same direction as the original excitation. These responses may be called the "physiological responses" of a live or fertile egg.

If, however, the egg is dead or sterile the response current, delivered in the apparatus after the excitation has ceased, will be negligible and usually in the opposite direction to that of the excitation, and in effect is merely an accidental current. This is indicated by a negligible deviation of the galvanometer 30 usually in the direction opposite to the excitation.

Thus, the egg after a period of incubation will give a definite physiological response if it is alive, and this response can be obtained for either position of the reversing switch 15: and hence a check may be made upon one direction of reading by employing the opposite direction of reading, with corresponding change of the switch 15. Furthermore, it has been found in practice that the positive and negative deflections of the galvanometer 30 bear a certain relationship to the degree of fertility or life activity of the egg, the period of incubation, etc., as noted in the above tables.

The exciting coil having the windings 22, 25 which was used during experimental work was the medical coil of the duBois-Reymond type, which was employed with the core tube in its innermost position, corresponding roughly to one thousand (1000) ergs. The battery 12 was operated between 2 and 6 volts, 6 volts being employed for the indications set forth in the above tables. The winding ratio of such coil is of the order of six hundred (600) primary turns to ten thousand (10,000) secondary turns with a resistance varying from two thousand (2000) to twenty-five thousand (25,000) ohms; it is highly preferable to employ a make and break device which gives an abrupt shock. The coil may be operated with a single break shock, although it was also effectively operated with an equal and opposite make and break, which appears to give a maximum effect.

It has further been found that an egg of any age whatever may be tested even though incubation has not progressed to such a degree as indicated above (e. g. thirty-six hours). Even a fresh and still warm egg may be tested. At temperatures down to about 60 degrees F., incubation is occurring though at successively slower rates as the temperature is lowered; while below this approximate temperature the egg may be regarded as dormant. A dormant egg should be treated so as to arouse it from a latent state if fertile, before being tested. For this purpose, for example, a cold egg may be warmed. The incubation temperatures of around 100° F. are satisfactory for the purpose with hens' eggs, as the eggs demonstrate a normal physiological activity at such a temperature. Extremely high temperatures inside the egg must be avoided, as the maximum temperature which an embryo can survive is around 110 degrees F. The warm and thus activated egg is then placed between the electrodes 10, 11 as before, and the "single" key 21 is depressed, with the reversing switch 15 in position to give a positive direction of flow of current between the electrodes 10, 11. Upon interrupting this current, the egg again responds by giving the characteristic sign if it be fertile. This response, however, is less than the response given by an egg which has advanced in incubation to an embryonic stage. It will be noted that during this early period of incubation, the fertile egg when activated responds in this apparatus by giving a positive current as a physiological response: while a dead, sterile, etc., egg again responds by giving a negligible current which is opposite in direction to the direction of the exciting current, or a small fraction of the magnitude of the response of a fertile egg.

When operating with the circuit arrangement of Figure 1, if the responses are relatively small (e. g. the eggs have been incubated for less than thirty hours), it is desirable that an amplifying device be employed in determining the electrical response of the egg especially if a rugged meter of low sensitivity is being used. For this purpose the switch 36 is thrown from the full line position to the dotted line position so that the response current then flows by the conductor 31a to an electron discharge tube 37 to modify the grid bias of this tube; with a return by a conductor 31b to the terminal of the secondary coil 22. The space current of the electron discharge tube 37 is then imposed upon the resistance 38 and thus delivered to a secondary electron discharge tube 39 for further amplification; the space current of the second tube 39 is passed through a sensitive meter 49 which then indicates the current value of the amplified current. A regulating resistance 51 may be employed in series therewith in order to make the resistance of the output circuit commensurate with the internal resistance of the tube 39, and also for the purpose of calibrating the meter 49 with respect to the meter 30, so that its indications, on the basis of amplification by the tubes 37 and 39, are multiples, preferably decimal multiples, of the corresponding indications of the meter 30 when used.

In the above description, the positive direction of current may be considered as from the electrode 11 to the electrode 10 (i. e. "ascending"), while the negative direction of current may be considered as from the electrode 10 to the electrode 11, (i. e. "descending").

In the tables, further, the values represent the potential of the response in volts, as determined with the apparatus of Figure 1.

Figure 2:
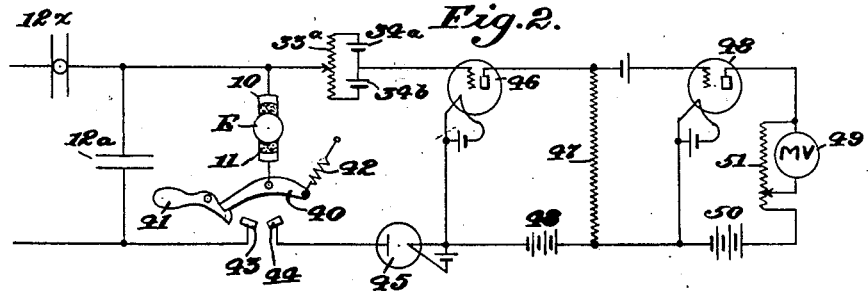
Figure 2 is a similar view of an apparatus which may be employed for determining the responses of eggs before incubation has progressed to a visible extent.

The form of construction shown in Figure 2 is particularly adapted for showing the fertility of eggs prior to say thirty hours of incubation, and hence to indicate whether a particular egg will probably hatch or not.

In Figure 2, the egg electrodes 10, 11 are connectable directly to a source 12a (illustrated as a condenser which may be charged through a small rectifier 12x of adjustable but limited output) of proper potential, through a timing switch. This timing switch has the moving blade 40 which is moved at a predetermined speed in a counter-clockwise direction by the spring 42 when the detent 41 is released. In this movement, the switch blade first encounters a fixed contact 43 and closes the energizing circuit through the electrodes which remains closed for a period determined by the sizes of the switch blade and contact and the speed of the movement of the blade 40, and is then opened. During this period an excitation of predetermined amount is given to the egg: it will be understood that the egg has been activated as by raising it to an incubation temperature. At a fixed time following the opening of the first circuit, the moving blade 40 encounters the second fixed contact 44 and closes a further circuit from the electrodes 10, 11 through a rectifying tube 45, operating as a uni-directional valve, to the cathode and grid of a three electrode electron discharge tube 46 so that the grid bias of this tube is varied in exact proportion to the response current from the egg, providing that this response is positive in direction, and hence able to pass through the rectifying tube 45. The normal bias of this tube is controlled by the duplex potentiometer-battery assembly 33a, 34a, 34b; and by suitable adjustment thereof, the accidental currents may be compensated as with the apparatus of Fig. 1; and also the meter deflections may be standardized by control of the amplification factor.

As indicated by the tables above, the response during the early stages of incubation is smaller than during later stages; and hence it is desirable, especially in apparatus intended for use by a nonexpert person, to employ an amplification for the current effects. For this reason, an electron tube 46 is employed, with a connection from its anode to an output resistance 47 and a plate battery 48, back to the cathode of the tube. The resistance 47 in turn is connected to the grid and cathode of a further electron discharge tube 48, which has its own anode connected to a millivoltmeter 49 with a return through the space current battery 50 and calibrating resistance 51 to the cathode of tube 48.

In the operation of this device, it is merely necessary to set the switch blade 40 in engagement with the detent 41, and to place the egg between the electrodes 10, 11. The detent 41 is then withdrawn so that the switch blade 40 begins its movement. The momentary closure of the energizing or exciting circuit through the warm egg is accomplished; and then the response of the egg to this excitation is determined by the possible modification of the grid bias of the tube 46. Counter currents are blocked by the unidirectional tube 45 from any substantial effect upon the electron discharge tube 46. If, however, the egg is fertile, a positive response is given by the apparatus, and this response causes a change in grid bias of the tube 46 which is repeated by a change of the voltage drop across the resistance 47, so that the electron discharge tube 48 operates to amplify it still more until finally the millivoltmeter 49 responds to a greater degree than would be the response had it been connected directly to the electrodes 10, 11.

It has been found experimentally that the response to excitation by a condenser of 5.54 mf. with a charging potential of 48 volts, by a sterile egg after 22 hours incubation ranges from zero to 0.5 millivolt; a fertile egg after 22 hours around 2.3 millivolts; at 72 hours around 16.7 millivolts, at 144 hours around 54.5 millivolts, as averages. The employment of a positive current prevents the passage of any current through the uni-directional valve 45 with the apparatus of Fig. 2 during the excitation period, such as might momentarily pass by reason of the coupling in the wires of the circuit. This circuit arrangement is, therefore, adapted for employment by an inexpert person since only the operations of (a) placing a warm egg between the electrodes, (b) setting and releasing the switch, and (c) reading the millivoltmeter, are required. This device has a further characteristic operation in that the response of the millivoltmeter 49 varies according to the relative fertility of the egg under test; and when the eggs are equally preheated, and the times of excitation and the times of determining the response are substantially standardized, the operator is enabled to compare the egg under test with other eggs and thus decide within a close range of probability as to whether the particular egg is worthy of incubation.

The above description sets forth forms of apparatus, and the methods employed, regardless of any theory of operation. It may, however, be pointed out that certain theoretical assumptions will explain the results obtained with the apparatus and method.

A hen's egg, for example, comprises an outer shell with a lining membrane, and an internal albuminous mass, commonly called the "white", and a more or less central albuminous mass commonly called the "yolk". The yolk is a compound body comprising (1) the yolk proper which constitutes the major portion of this central albuminous mass; (2) the cytoplasm which is of lesser specific gravity than the yolk proper, and hence normally is at the upper portion of the yolk; and (3) a nucleus located within the cytoplasm and at the upper portion thereof. These several parts of the egg are separated from one another by membranes.

The yolk, cytoplasm and nucleus are so constituted that when an egg is lying with a minor diameter constituting a vertical axis, any rolling of the egg will be accompanied by a movement of the yolk, cytoplasm and nucleus, so that these parts always tend to return to an uppermost position relative to their respective enclosing media.

In the dead or sterile egg, there may or may not be a differentiation of relatively acid and alkaline portions between the several parts of the cytoplasm and nucleus. These portions, however, may be regarded as in equilibrium or balance with one another. The characteristic of the nonfertile egg therefore is its electrical balance. The entrance of a spermatozoon, however, causes the nucleus to become relatively acid with respect to the cytoplasm. Hence, a vertical line through the egg will pass successively through an upper relatively acid portion and a lower relatively alkaline portion within the membrane enclosing the cytoplasm. In theory, it may be regarded that during incubation the lack of balance between the acid and alkaline portions causes a mutual repulsion in the portions which are respectively acid and alkaline, and hence have positive and negative electric charges, so cell division occurs and hence embryonic development. The upper acid portion constitutes a positive pole and the lower alkaline portion a negative pole of a living electric cell. The relative increase of charges by cell division may be set forth as one explanation for the varying electrical responses given by my apparatus. This cell division, further, produces initially the blastoderm and thereafter, in succession, neural and skeletal systems of the chick. Each succeeding development represents a change in the electric charge relationships in the egg, considered as an electric cell, which may be determined by the apparatus and method described herein. Upon death, the membranes decompose and hence an electric balance has again occurred, and hence there is no longer cell division, nor such a differentiation as may be determined with a living egg. It will be understood that this is merely set forth as one presumptive explanation, but that the method is not necessarily based thereon, since it yields definite results regardless of whether this theory be correct or not.

It is preferred to employ a timing switch to control the passage of current so as to impose abruptly a potential upon the electrodes which causes an excitation of the egg and thereafter to abruptly terminate the excitation.

In making comparative tests, it is desirable that the various parts of the apparatus should be at definite predetermined and standard conditions during a series of tests. Thus, the potential of the source of electrical energy, the length of time of excitation, the duration of time between excitation and determination of the response, and the other electrical and time constants in the apparatus, should be maintained throughout a particular series of tests. Furthermore, when a batch of eggs, for example, is to be compared with respect to fertility, it is preferable that they should be brought alike to the aroused condition, as by warming to an incubation temperature by the same method and in and for the same length of time; and that the temperatures of the electrodes and other parts of the apparatus be maintained. In this same connection, it is preferred to have the electrodes at the same temperature as the egg undergoing test to prevent the establishment of accidental or polarization currents, and to avoid difficulties from any heating or cooling of the eggs.

A means for employing the strictly potential method is disclosed and claimed in my copending application Serial No. 83,383, filed June 3, 1936.

It is obvious that the invention is not limited to the employment of the apparatus described, nor to the practicing of the specific method as set forth, nor to employment only with hens' eggs, but that it may be practiced in many ways within the scope of the appended claims.

I claim:

1. The method of testing eggs for life activity, which comprises arousing the egg, exciting the egg by imposing an electromotive potential thereon, and determining the response upon excitation.

2. In a method of testing eggs for life activity, the step which comprises imposing an electromotive potential upon the egg.

3. The method of testing fertile eggs for life activity, which comprises imposing an electromotive potential upon an egg whereby to excite the same if in an aroused condition, and determining the response of the egg at such excitation.

4. The method of testing eggs for life activity, which comprises bringing the egg to incubation temperature, imposing an electromotive potential upon the egg and determining the electrical response upon the imposition of such potential.

5. The method of testing aggs for life activity which comprises bringing the egg to incubation temperature, abruptly and momentarily imposing an electromotive potential upon the egg, and ascertaining the electrical response after the cessation of the potential.

6. The method of testing eggs for life activity which comprises bringing the egg to incubation temperature, imposing an electromotive potential on the egg, and determining the direction of the electric current response upon the imposition of such potential.

7. The method of testing eggs to determine their relative life activity which comprises maintaining the eggs at the same incubation temperature for the same period of time, imposing a standard electromotive potential on the eggs for a predetermined time interval, and measuring the electric current responses at a predetermined time interval after the cessation of the said potential.

8. The method of testing eggs for life activity which comprises bringing the egg to incubation temperature, imposing a positive electromotive potential upon the egg, and determining the positive electric current response upon the imposition of such potential.

9. The method of testing eggs for life activity, which comprises bringing the egg to incubation temperature, imposing an electromotive potential between the top and the bottom of the egg, and determining the electric current response occurring in a vertical direction in the egg upon the imposition of such potential.

10. The method of testing eggs for life activity, which comprises bringing the egg to incubation temperature, passing an exciting electric current vertically through the egg while held with a minor axis vertically, and thereafter determining the difference in electrical potential between the top and the bottom of the egg.

11. The method of testing eggs for life activity, which comprises bringing the egg to incubation temperature, abruptly imposing a standard electromotive potential for a standard period of time between the top and the bottom of the egg while held with a minor axis vertical, and at a standard time thereafter determining the difference in electrical potential between the top and the bottom of the egg, whereby to obtain a comparable figure indicating the relative life activity of the egg being tested.

12. The method of testing eggs for life activity, which comprises bringing the egg to incubation temperature, establishing a counter-electromotive force between the top and the bottom of the egg to compensate accidental electric currents, imposing an exciting electromotive potential on the egg in a vertical direction, and determining the electrical response upon the imposition of such potential.

13. The method of testing eggs for life activity, which comprises establishing a counter-electromotive force between the top and bottom of the egg to compensate accidental electric currents from the egg, passing an exciting electric current through the egg, and determining the direction of the electric current response upon the passage of such exciting current.

14. The method of testing fertile eggs to determine the progress of incubation which comprises imposing an exciting electromotive potential vertically on the egg in one direction and determining the electrical response of the egg upon the imposition of such exciting potential, and then imposing a second exciting electromotive potential vertically on the egg in the opposite direction, and determining the electrical response upon the imposition of such second exciting potential, and comparing the said responses with the responses given by eggs after known periods of incubation.

15. The method of testing eggs for life activity, which comprises bringing the egg to incubation temperature, compensating for accidental currents of the egg, passing an exciting electric current through the egg in one direction and determining the direction of the electric current response upon the passage of such exciting current, thereafter passing an exciting electric current through the egg in the opposite direction and determining the direction of the electric current response upon the passage of such second exciting current.

16. The method of determining the absence of life activity in an egg which includes the step of determining the value of the inherent electromotive force of the egg.

17. The method of determining the life activity of an egg which includes the step of establishing a counter-electromotive force to compensate the inherent potential of the egg, imposing an electromotive potential upon an egg whereby to excite the egg if alive and aroused, and determining the response upon excitation.

18. The method of testing fertile eggs to determine the effects of the incubation to which the egg has been subjected, which comprises passing an exciting positive electric current through the egg while at incubation temperature, compensating accidental electric currents from the egg, and determining the direction and magnitude of the electric current response upon the passage of such exciting current.

19. An apparatus for testing eggs for life activity, comprising a source of electric current, means to pass an exciting current from said source through the egg, and an indicating device to determine the electrical response upon the passage of such exciting current.

20. An apparatus for testing eggs for life activity, comprising a source of electric current, means to pass a momentary exciting current from said source through the egg, an electric measuring instrument, electric circuit means for connecting said instrument and the egg in series and including a switch contact, and means to close said circuit through said contact a predetermined time after the cessation of said momentary current.

21. An apparatus for testing eggs for life activity, comprising a source of current, electrodes and positioning means for holding the same in contact with the top and the bottom of an egg, conductors for connecting said source and electrodes in a first circuit, an electric measuring instrument, conductors for connecting said instrument and electrodes in a second circuit, a switch having two contacts whereby it is adapted to close said circuits selectively, and means to operate said switch whereby it successively closes and opens said first circuit and then closes said second circuit.

22. An apparatus for testing eggs for life activity, comprising a source of current, electrodes and positioning means for holding the same in contact with the top and the bottom of an egg, conductors for connecting said source and electrodes in a first circuit by which a positive electric current may be passed between the said electrodes, an electric measuring instrument, conductive means for connecting said instrument to said electrodes and including a unidirectional valve to prevent passage of current from said source to said instrument, and a switch connected in said first circuit for interrupting the same.

23. An apparatus for testing eggs for life activity, comprising a pair of electrodes arranged substantially one above the other and between which the egg may be placed with a vertical minor axis, a source of exciting electric current, an electric meter, and a switch for successively connecting said electrodes to said source, and then to said meter.

24. An apparatus for testing eggs for life activity, comprising a pair of electrodes arranged substantially one above the other and between which the egg may be placed with a vertical minor axis, a source of exciting electric current, an electric meter, and switch devices to connect said electrodes to said source while short-circuiting said meter, and thereafter to open-circuit the connection to said source and to open the short-circuiting of said meter.

25. An apparatus for testing eggs for life activity, comprising a pair of electrodes arranged substantially one above the other and between which the egg may be placed with a vertical minor axis, a source of exciting electric current, an electric meter device, a uni-directional valve, a switch having two alternative contacts, conductors for connecting said source and electrodes in series through one of said contacts, conductors to connect said meter device, electrodes and valve in series through the other of said contacts, and means to move said switch to close said contacts successively.

26. An apparatus as in claim 25, in which the electric meter device includes an amplifier having an electron discharge tube including a cathode, an anode and a grid, and said conductors join said electrodes and valve to the grid and cathode of said tube, means included in series with said electrodes to vary the grid potential of said tube whereby to compensate accidental currents.

27. An apparatus for testing eggs for life activity, comprising a source of electric current, means including a current reversing switch to pass an exciting current from said source through the egg, and an indicating device to determine the electrical response upon the passage of such exciting current in each direction through the egg.

28. An apparatus for testing eggs for life activity, comprising a source of electric current, means to pass an exciting current from said source through the egg, means to compensate accidental currents, and an indicating device to determine the electrical response upon the passage of such exciting current.

29. An apparatus for testing eggs for life activity, comprising a source of current, means to pass an exciting current from said source through the egg, a source of compensating electric current, a reversing switch connected in the circuit of said passing means and connected to said source of compensating current whereby a compensating electromotive force may be imposed upon said egg in a selected direction, and an indicating device to determine the electrical response upon the passage of such exciting current.

30. An apparatus for testing eggs for life activity, comprising a source of electric current, electrodes between which the egg may be positioned, means to connect said source and said electrodes in series circuit, a reversing switch included in said series circuit, a source of compensating electric current connected to said reversing switch whereby a compensating electromotive force may be imposed in either direction upon said egg independently of current from said first source, an electric measuring instrument, electric circuit means for connecting said instrument and the electrodes in series, and means to open said series exciting circuit and thereafter close said measuring instrument circuit.

31. An apparatus as in claim 30, in which said exciting circuit and said instrument circuit have a common portion, and said reversing switch is located in said common portion.

32. An apparatus for testing eggs for life activity, comprising a source of electric current, electrodes between which the egg may be positioned, circuit means including a circuit opening device to connect said source and electrodes in series and including a reversing switch to control the direction of excitation by said source, an electric measuring instrument, and means including a circuit opening device for connecting the electrodes and said measuring instrument in series, and a source of compensating electric current connected in said measuring instrument circuit.

33. An apparatus for testing eggs for life activity, comprising electrodes between which the egg may be positioned, means to impose an electromotive potential upon said electrodes, an electric measuring instrument, and means for connecting said electrodes and said instrument and including devices to amplify the electric response of the egg upon the imposition of the potential upon said electrodes.

34. An apparatus for testing eggs for life activity, comprising electrodes between which the egg may be positioned, means to impose an electromotive potential upon said electrodes, a first and second electric measuring instrument, an amplifying device having its output connected to said second instrument, means including said device for connecting said instruments to said electrodes, and means for controlling the output current of said amplifier whereby the reading of said second instrument may be made a decimal multiple of the reading of said first instrument.

35. The method of testing eggs for life activity which includes the steps of placing the egg in an electric circuit, determining the value of the inherent physiological currents arising from the egg, imposing an E. M. F. upon the egg whereby to excite the same if alive and aroused, and determining the response of the egg to such excitation.

36. The method of selecting eggs for relative life activity or ability to hatch, which comprises subjecting the eggs to an incubation temperature for a time period at least sufficient to arouse the same, imposing a standard electromotive potential upon each egg, and rejecting for hatching purposes those eggs whose responses do not equal a standard.

37. An apparatus for testing eggs for life activity, including electrode structures having moistened portions for engaging the egg shell, conductor means connected to said electrode structures, a metering device connected to said conductor means for determining the electromotive potential difference between said electrode structures, a reversing switch, and a variable supply means for compensating current connected to said switch, said switch being connected to said conductor means so that a selected amount and direction of compensating potential difference may be imposed at said electrode structures.

38. An apparatus for testing eggs for life activity, comprising a pair of testing electrodes arranged substantially one above the other and between and in contact with which an egg may be placed with a vertical minor axis, an electric meter device, conductor and circuit control means connecting the testing electrodes with the meter devices and including an amplifier having an electron discharge tube including a cathode, an anode and a control electrode, said cathode being connected to one testing electrode and said control electrode being connected to the other testing electrode, and means included in the conductor extending to the control electrode for varying the controlling potential thereat whereby to compensate accidental currents of the circuit and effect the adjustment of the meter device to a desired initial indication.

FREDERICK LANGDON RIVENBURGH.